US006910073B2

(12) United States Patent
Banga et al.

(10) Patent No.: US 6,910,073 B2
(45) Date of Patent: Jun. 21, 2005

(54) METHOD FOR TRANSFERRING AND DISPLAYING DATA PAGES ON A DATA NETWORK

(75) Inventors: Gaurav Banga, Houston, TX (US); Frederick Douglis, Somerset, NJ (US); Hosagrahar Visvesvaraya Jagadish, Berkeley Heights, NJ (US); Michael Rabinovich, Gillette, NJ (US); Kiem Phong Vo, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 686 days.

(21) Appl. No.: 09/852,750

(22) Filed: May 11, 2001

(65) Prior Publication Data

US 2001/0020248 A1 Sep. 6, 2001

Related U.S. Application Data

(63) Continuation of application No. 09/366,345, filed on Aug. 2, 1999, now Pat. No. 6,240,447, which is a continuation of application No. 08/729,105, filed on Oct. 11, 1996, now Pat. No. 5,931,904.

(51) Int. Cl.$^7$ .............................................. G06F 13/00
(52) U.S. Cl. ..................................... 709/225; 709/219
(58) Field of Search ............................... 709/200–203, 709/217–220, 223–227

(56) References Cited

U.S. PATENT DOCUMENTS 5,754,774 A * 5/1998 Bittinger et al. ............ 709/203
5,859,971 A * 1/1999 Bittinger et al. ............ 709/203
5,867,661 A * 2/1999 Bittinger et al. ............ 709/227
5,878,213 A * 3/1999 Bittinger et al. ............ 709/203
6,003,087 A * 12/1999 Housel et al. .............. 709/229

OTHER PUBLICATIONS

Bill N. Schilit, et al., "TeleWeb: Loosely connected access to the World Wide Web," Computer Networks and ISDN Systems, vol. 28, May 1996, pp. 1431–1444.
A. Luotonen, K. Altis, "World–Wide Web proxies," Computer Networks and ISDN Systems, vol. 27, Nov. 1994, pp. 147–154.
T. Ball, F. Douglis, "An Internet Difference Engine and its Applications," Digest of Papers of Compcon, Feb. 25, 1996, pp. 71–76.

* cited by examiner

*Primary Examiner*—Moustafa M. Meky

(57) ABSTRACT

The apparent speed of a connection between a browser at a user station and a proxy or gateway on a network such as the Internet is increased by providing a local proxy at the user station which interacts with a remote proxy. While the remote proxy is retrieving a newly requested World Wide Web page, for example, from the appropriate content provider, it may also be sending to the local proxy a stale cached version of that page. When the new version of the page is finally retrieved, the remote proxy determines the differences between the new version and the stale version, and, assuming the differences do not exceed the new page in size, sends the differences to the local proxy which then reconstructs the new page from the differences and the stale version. The local proxy delivers the new page to the browser, which need not even be aware that a local proxy exists; it is aware only that it received the page it requested. Because computational speed and power are frequently higher and cheaper than transmission speed, the apparent speed of the connection between the user station and the network has been increased at modest cost.

19 Claims, 5 Drawing Sheets

METHOD FOR TRANSFERRING AND DISPLAYING DATA PAGES ON A DATA NETWORK

This application is a continuation of U.S. patent application Ser. No. 09/366,345, filed Aug. 2, 1999, now U.S. Pat. No. 6,240,447, which is a continuation of U.S. patent application Ser. No. 08/729,105, filed Oct. 11, 1996, now U.S. Pat. No 5,931,904, both of which are incorporated herein by reference in their entirety.

BACKGROUND OF THE INVENTION

This invention relates to a method for transferring and displaying data pages at a station connected to a network by a low-speed connection. In particular, this invention relates to a method for reducing the delay between the time a data page is requested and the time the page is displayed.

In data networks such as the Internet, data is stored on servers interconnected by high-speed connections. Such networks support protocols, such as the Hypertext Transfer Protocol ("HTTP") used in the popular World Wide Web portion of the Internet, in which data is transmitted to users in a format known as a "page." Under the HTTP protocol, the user interface software (known as a "browser") cannot begin to display a page until a significant portion of the page has been received, and clearly cannot fully display the page until the entire page has been received. The resulting delays are referred to as "latency."

Unfortunately, many Internet users are connected to the Internet by relatively slow connections using a modem and a standard telephone line. Even the fastest commercially available telephone modems are limited to speeds of 28.8 kilobits per second ("kbps"), or in some cases 33.6 kbps. This limits the speed at which a World Wide Web page can be transmitted to a user and displayed by the user's browser. In addition, heavy user traffic, particularly heavy access by other users to the same server, also slow down the apparent speed of the World Wide Web. As a result, many users complain about the slow speed of the Internet in general, and the World Wide Web in particular. In fact, much of the latency perceived by users is the result of their relatively slow connection to, and heavy traffic on, what inherently ought to be a very fast network.

Currently available browser software makes some attempts to eliminate delays in receiving World Wide Web pages. For example, most browsers will store received pages in a disk cache. If the user asks for a page within a short time after having asked for it previously, the browser will retrieve the page from the cache. However, under the HTTP protocol, certain World Wide Web pages may not be cached, such as those that are dynamically generated. Therefore, current caching techniques are of limited usefulness in solving the latency problem.

It would be desirable to be able to reduce the perceived delays encountered in transmitting data pages from a relatively fast network to a user connected to the network by a relatively slow connection.

It would also be desirable to be able to make better use of the caching capabilities of browsers.

SUMMARY OF THE INVENTION

It is an object of this invention to reduce the perceived delays encountered in transmitting data pages from a relatively fast network to a user connected to the network by a relatively slow connection.

It is also an object of this invention to make better use of the caching capabilities of browsers.

In accordance with this invention, there is provided a method for transferring and displaying data pages on a data network of a type on which data can be retrieved in a page format. The network has at least one server on which the data pages are stored, a gateway connected to the servers, and a user station connected to the gateway by a data connection having a finite speed. The user station requests one of the pages from one of the servers. The method comprises sending a request from the user station to the gateway for retrieval of the data page from one of the servers. In response to that request, an earlier version of the data page is recalled. If the earlier version is determined not to be current, a retrieval of the data page from that one of the servers to the gateway, for transfer to the user station, is initiated. After receipt at the gateway of a response to the request, a difference between the requested data page and the earlier version of the page is determined, and that difference is transmitted to the user station. At the user station, the data page is calculated as a function of the earlier version and the difference. The calculated page is then displayed at the user station.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
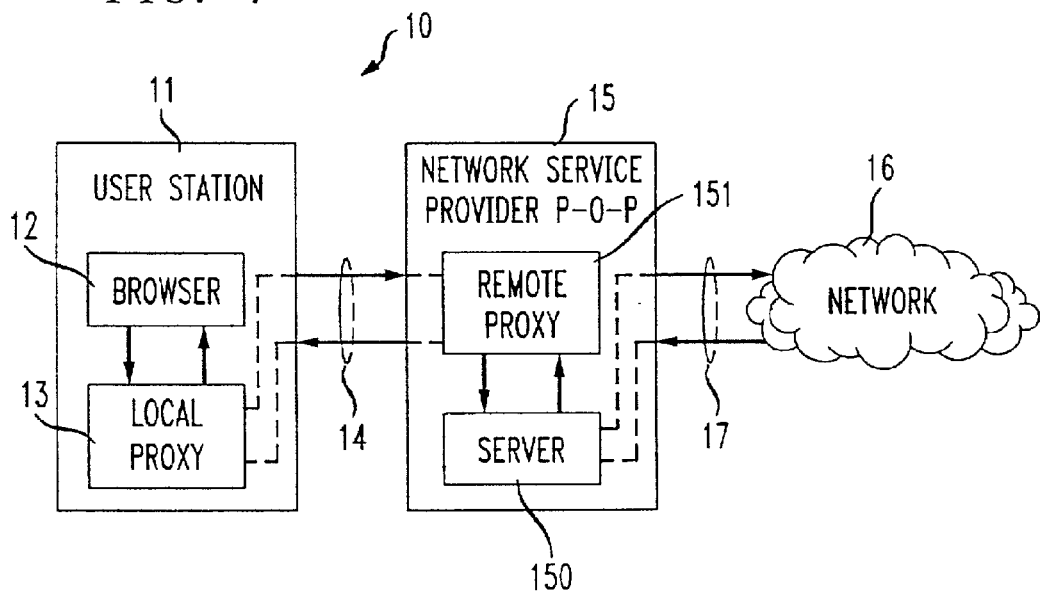
FIG. 1 is a schematic block diagram of a system with which the method of the present invention may be used.

Although applicable generally to network data transfers, the present invention is particularly useful, and lends itself to ready explanation, in connection with the Internet, and particularly the World Wide Web. The World Wide Web architecture employs, at the network gateway end of a user's connection, an application known as a proxy. World Wide Web browser software is designed to communicate with a proxy, which in turn relays the browser's requests to the network servers, and returns the requested data in the form of one or more pages. In accordance with the present invention, a second proxy, hereinafter referred to as a "local proxy," preferably is established at the user's computer by software. When the user's browser software attempts to contact a proxy, it is connected to the local proxy. As far as the browser software is concerned, it is connected to a proxy as it expects and requires. The local proxy in turn communicates with the proxy at the network end of the connection (hereafter the "remote proxy").

The presence of the local proxy allows the use of various techniques that enhance the apparent speed of the connection to the network. One can design the local proxy to employ such techniques without changing users' browser software. Ultimately, one or more such techniques may be built into browser software, effectively building the local proxy into the browser. However, the present invention can be used with existing browsers by providing separate local proxy software.

A preferred technique that can be used with the local proxy for enhancing the apparent connection speed relies on the fact that, at present, computational speed and ability at the user station is more readily available, and cheaper, than a faster connection. Thus, the invention relies on the retrieval of a cached version of a requested page and the subsequent transmission from the remote proxy to the local proxy of only the differences between the cached version and the current version. The user station, using its relatively fast and cheap computational resources, reconstructs the current page from the cached version and the received difference data.

A preferred technique for calculating the difference data is the technique described in U.S. patent application Ser. No. 08/355,889, filed Dec. 14, 1994, now abandoned which is hereby incorporated by reference in its entirety. However, other techniques, as may be known to or developed by those skilled in the art, may be used.

In order for the remote proxy to be able to send the difference data to the local proxy, it must calculate the difference data by comparing the current page, once it is received at the remote proxy, to the version of the page already available at the local proxy. That requires the remote proxy to know which version of the page is already present at the local proxy. This can be accomplished in several ways.

First, the remote proxy must cache at least one version of the page (if the page requested by the user has never been requested by any user connected to the remote proxy, there would be no alternative to waiting for the full current page to be received at the remote proxy and sending the entire page, except that it may be possible to begin sending the entire current page before it is completely received at the remote proxy).

In one embodiment, the local proxy also caches the page (assuming it has requested it previously), and as part of its request for the data page, identifies which version it already has cached. The remote proxy would check to see whether or not it had that particular version cached and, if it did, it would use that version to calculate the differences once the current page was received. If the remote proxy did not have that version cached, it would send to the local proxy the most recent version it did have, while waiting for the current data to arrive.

In a variant of that embodiment, the remote proxy would cache several different versions of a page, to increase the likelihood that it has the version cached by the local proxy. In another variant, the local proxy also would cache more than one version of a page. For example, the local proxy could be programmed to cache the most recent version of any page retrieved, as well as any page tagged to be cached. In that embodiment, preferably the remote proxy would tag certain pages to be cached by local proxies—e.g., the noon version of a popular news page might always be cached, and retained even if a later version is retrieved (the later version would also be cached). Increased caching by either proxy would reduce the amount of data to be transmitted while the remote proxy awaits the current page, but requires more storage capacity at one or both proxies. More storage might be easier at a remote proxy, often associated with a content provider or network service provider, but might be costly at the local proxy, which is usually at a home or office personal computer.

When the remote proxy requests the current page from the content provider, it may request that the page be sent only if it has changed since the time of the last version it has, or the version it knows the local proxy has or should have. The HTTP protocol provides commands for such requests. If the remote proxy gets back a message that there has been no change, it can then send a message to the local proxy that the page that the local proxy already has is current (either because it had previously cached the page, or because the remote proxy had sent the page while awaiting a response from the content provider's server), and the local proxy can then deliver the page it already has to the browser for display.

If, on the other hand, the remote proxy receives a new version of the page, it must then decide whether it should send the new version of the page or calculate and send the difference data. This depends on several factors.

If the local proxy already has the previous version of the page (either because it had cached it, or because the remote proxy was able send it while waiting for the current version), then the most significant factor in deciding whether to send the entire current version or to calculate and send the difference is the relative size of the new version and the difference data. Thus the remote proxy would calculate the difference data, and then compare the size of the difference data to the size of the new version. If the new version is not larger than the difference data, the remote proxy would send the new version with a message telling the local proxy that it is the new version and that reconstruction based on the old version is not necessary. The local proxy would then pass the new version to the browser for display.

If the new version is larger than the difference data, then the remote proxy must make a decision based on how much larger the new version is. Because there is some time required for reconstruction by the local proxy, if the new version is the same size as, or only slightly larger than, the difference data, then it may still be faster (in terms of when the user will be able to view the requested page) to send the new version rather than the difference data. The determination of how much larger the new version can be before it no longer makes sense to send it may depend on a number of factors, which might have to be measured in real time, resulting in dynamic calculation of the threshold size for sending difference data rather than new data. However, if the calculation depends on variables that cannot be determined easily by the remote proxy, such as the processor speed at the user station, an alternative is to have the remote proxy simply assume that the new version can be up to about 120% of the difference data and still be sent in its entirety.

If the requested page arrives at the remote proxy while the remote proxy is still sending an older "stale" version of the page to the local proxy, then the remote proxy must make a determination as to whether or not to continue, or to abort and simply send the new version of the page in its entirety. Again, this depends on a comparison of how long it will take to send-the new-version and how long it will take to complete sending the old version and to calculate and send the difference data. The time required to send the new version may be known if its size is known, or it may be estimated using appropriate statistical assumptions. Similarly, the time required to complete sending the stale data is known. What is not known is the size of the difference data. If the size of the new version is smaller than that of the remaining stale data, then the new version is sent. Otherwise, an assumption is made that the difference data will be some average amount, which in the preferred embodiment is 40%, of the size of the stale page. Therefore, if less than 40% of the stale data has been sent (i.e., more than 60% remains), the transmission of stale data may be aborted in favor of simply sending the new version. Conversely, if more than 40% of the stale data has been sent (i.e., less than 60% remains), it may make sense to continue to send the remaining stale data, plus the difference data, because the latter two items together would be smaller than the new version.

Of course, if the transmission of stale data is continued, and the difference data calculated, it may be discovered that for this particular request, the difference data is larger than 40%, in which case the decision would have been counterproductive. Or if it were decided to send the new version, it may have turned out that the difference data were smaller than expected. However, on average it could be expected to be productive, in the absence of other data, to use 40% of the page size as a default for the difference data size. It may also be possible, for example, to keep track of difference data sizes over time, either globally or for individual pages (e.g., by URL) or servers, and to use that information to adjust the default difference data size periodically. Alternatively, it may be possible to estimate or calculate the size of the difference data incrementally ("on the fly") as discussed below.

In some cases, one might determine while still transmitting stale data, or afterwards, that the difference data are so large—even difference data larger than the page size are theoretically possible—that it would not make sense to continue. At that point, the decision to send stale data plus difference data could be reversed, the transmission of stale data if still in progress could be aborted, and the new page in its entirety could be transferred. Even if the transmission of stale data has been completed, it would still make sense to send the new page in its entirety, assuming that the difference data are larger than the new page.

The preferred embodiment of the difference data calculation technique described in the above-incorporated copending patent application outputs as a "side-effect" a compressed version of the original page data. This provides a compressed version of each page which can be stored in the cache in place of the uncompressed version, thereby increasing the number of pages that can be cached for a given cache size. Moreover, that technique produces difference data that at most total no more than a few bytes more than the new version of the data page. Therefore, if that preferred technique is used, then one may not need to abort the transmission of difference data, because there would be no penalty in not doing so. However, the discussion that follows is generic to any difference calculating technique that might be used, including one that may not be so efficient as the preferred technique.

The discussion so far has assumed that the user has requested a page whose address is the same as that of a page that has already been cached—e.g., in the context of the World Wide Web, a page having the same Uniform Resource Locator ("URL"). However, the present invention may also be useful in cases where pages are similar even though their addresses are not identical. These might include pages that have identical static content even though certain variable fields may differ. For example, on a World Wide Web site containing multiple pages, the various pages may have a similar layout with features in common. Similarly, pages containing the results of a query to a particular search engine will generally have substantially the same graphical layout; only the text data will differ from one query result to another. Therefore, if a query to a particular search engine is initiated by the user, the system can retrieve in advance from its cache, either at the local proxy or the remote proxy, a generic page for that search engine, or the last cached query result from that search engine; the needed difference data can be computed from either.

Locating such a cached query result would not be difficult in the case of the World Wide Web. URLs for search results from a particular search engine usually share a common "stem"—i.e., the beginning portion of the URL is the same, with later portions specifying the particular search. The search criteria are frequently preceded in the URL by the character string "cgi-bin," which usually follows the stem. The system could be designed so that, on seeing those characters in a URL, it seeks a cached version of any page whose URL has the same stem as the current URL. Other techniques which look more broadly at cached pages for similar pages are those that compare received data to any cached page originating at the same host and having similar size. In such a case, the remote proxy might have to keep better track of which pages have been sent to which local proxies. A brute force comparison of every cached page could also be made, but, unless by chance a close match were found early, it might take longer than simply transmitting the new page.

It has further been assumed in the discussion so far that difference data are not calculated until the remote proxy has received the entire new version of the page. However, the present invention includes the possibility of calculating the difference data "on the fly"—i.e., on a continuing basis as the new version is received.

For example, an arbitrary data size may be selected, and as each "chunk" of data that size is received at the remote proxy, a comparison with the cached version is made to extract the difference data. The size of the "chunk" is selected to be large enough so that the system is not forever calculating difference data from minute samples, but small enough to generate data that can be sent frequently enough to make a difference in the performance of the system.

If the difference between the two versions of the page is that there has been an insert of text, then well-known comparison techniques can detect that and the system could send the insert along with an "insert" command, without having to send a difference for every chunk. Similarly, if the difference between versions is that there was a deletion, the system might handle that in a similar way (e.g, using a "delete" command), rather than compute a difference for each chunk.

Similarly, such a system is preferably able to decide when to send the difference data. If the difference data for a particular chunk are small, it may not make sense to send those data as soon as they are generated, but rather to wait for additional difference data to be generated. The amount of difference data to be accumulated before being sent to the local proxy can be quantified in a preferred embodiment as follows:

Let D be the total number of unsent bytes of difference data, including difference data that have been generated but have not been sent. Let $D_{tot}$ be the total number of bytes of difference data that have been generated, whether or not they have been sent. Let C be the number of bytes of the new version that have already been processed. Let S be the size of the original page. Let $T_{small}$ be a minimum threshold and $T_{large}$ be a maximum threshold.

According to this embodiment, the accumulated difference data are sent if $T_{small} < D$ and $D_{tot} < F(S,C,T_{large})$, where F is a function of the size of the original page, the size of the data that has been processed so far, and the threshold $T_{large}$. F generates a cut-off when it is no longer advantageous to send the difference data. The cut-off might be 80% of the original file size (0.8S) based on cumulative bytes received. Alternatively, S could be ignored and the difference data would be sent as long as $D_{tot} < 0.8C$. More complicated functions can also be used.

If $D < T_{small}$, difference data would not be sent. Instead, any difference data that had been accumulated would be held until more difference data had been calculated. For example, $T_{small}$ could be one-half the maximum packet size, an amount below which it would be uneconomical to send the data.

On the other hand, if $D_{tot} \geq F(S,C,T_{large})$, then the difference data already computed are so large that the computation of the difference data is aborted. Instead, the new page is sent in its entirety. Consistent with the "on-the-fly" nature of this embodiment, the system preferably does not wait for the whole page to arrive before sending it to the local proxy, but instead sends as much as has already been received and continues to send the new page data as they arrive. Note that if the preferred difference calculating technique referred to above is used, it is almost never disadvantageous to continue sending the difference data.

In addition, it may be useful to test the total amount of difference data remaining to be sent, including difference data not yet computed, against the presumed size of the new version. The amount of data yet to be sent can be estimated as the amount of any difference data already computed but not yet sent, plus the amount of all difference data yet to be computed. The latter value might be estimated as a function of the difference between the total size of the earlier version of the data page and the size of the portion of the new version already processed.

As discussed above, if the difference data are being calculated on the fly, then the comparison of the amount of stale data in transit still to be sent plus the amount of difference data to the amount of data involved in sending the new page in its entirety can also be calculated, or at least estimated, on the fly. That way, the decision as to whether or not to continue sending stale data can be made based on better information. This can be done as follows:

Let A be the size of the original (stale) version of the page. Let B be the size of the new version of the page (if B is not known it may be set equal to A as an estimate). Let $P_A$ be the size of the portion of the original version of the page already sent to the local proxy (equal to A when all of the original version of the page has been sent). Similarly, let $P_B$ be the size of the portion of the new version of the page already received at the remote proxy. These variables all have known values. Note that if the preferred difference calculation technique described above is used, these variables may represent quantities of compressed data (as stated above, the preferred embodiment of a routine for determining difference data also compresses the data). When referring explicitly to compressed data, the notation $C_x$ can be used to represent the compressed version of the quantity represented by x.

Let $\Delta_{B,A}$ be the size of the data representing the difference between the original and new versions of the page. Let $C_B$ be the size of the compressed version of the new page. These two variables are known as soon as all of the new version is received. Let $\Delta P_B, A$ be the size of the data representing the difference between the original version of the page and the portion of the new version already received. This variable is known as soon as the partial data for the new version are received.

If $P_A = A$, then the stale data have been sent in their entirety, and the difference data can be sent as they are computed. If $P_A < A$, then the stale data are still being transmitted, and a decision must be made whether or not to abort that transmission and simply send the new version of the page. As discussed above where the difference data are not computed until the complete new version is received, this depends on being able to estimate the total size of the difference data. However here, where the difference data are computed on the fly, the estimate can be more accurate.

Specifically, the stale data preferably are still transmitted if the amount of stale data remaining, plus the estimated size of the difference data, is less than the estimated total size of the new version (or the compressed new version where compression is available as in the preferred embodiment):

$$C_A - P_{C_A} + \Delta_{B,A} < C_B$$

If one assumes that the total size of the difference data is proportional to the size of the difference data for a portion of the page (frequently but not always true), then once a partial difference has been computed, the total size of the difference data can be estimated:

$$\Delta_{B,A} \approx B*((\Delta P_B, A)/P_B)$$

For example, if the size of the difference data for the first half of the new version of the page is one quarter of the original page size, one could estimate the total size of the difference data for the new version of the page would be twice that, or one-half the original page size.

If compression is used, compressed file size must also be estimated. If the original version was sent to the local proxy in compressed form, its size $C_A$ is known. The size $C_B$ of the compressed new version can be estimated as:

$$C_B \approx B*(C_A/A)$$

Alternatively, the compression rate of the whole page can be estimated from the size of the compressed version of part of the page once available:

$$C_B \approx C_{P_B}*(B/P_B)$$

Given these estimates, it is at any time possible to determine whether the remaining stale data should be transmitted or aborted. As more of the new version of the page is received, the estimates improve.

FIG. 1 shows a schematic block diagram of a system 10 with which the method of the present invention can be used. User station 11 is typically a personal computer running browser software 12. User station 11 also runs local proxy software 13, which generally would be provided by the user's network service provider if the network service provider's own system were capable of using the method of the invention. User station 11 is connected to network service provider point-of-presence 15 by "slow" link 14 (preferably a modem connection as described above). Network service provider point-of-presence 15 is preferably connected to network 16 (e.g., the Internet) by a preferably very fast connection 17 such as a T1 connection. The network service provider point-of-presence 15 preferably includes a gateway server 150 having remote proxy 151 (preferably existing in software), which communicates with local proxies 13 of various user stations 11 (only one shown). Note that just as the function of local proxy 13 can be incorporated into browsers themselves as discussed above, the same is true of the remote proxy function, which can be incorporated into gateway server 150. The HTTP protocol allows a browser (or local proxy) to identify what cached version (if any) of a requested page it has; a server with the remote proxy built in could generate and transmit difference data itself, if it determines that that is appropriate based on the relative data sizes involved (see below), which it would-know because it has the new version.

Network 16 includes other network service provider points-of-presence, as well as content provider points-of-presence having content servers, from which users seek information through the network service providers.

The user's browser 12 is designed to communicate with a proxy. In known systems, the proxy with which browser 12 communicates is remote proxy 151. However, in the present invention, where user station 11 has local proxy 13, and the network service provider is compatible with the method of the invention, browser 12 communicates with local proxy 13, which in turn communicates with remote proxy 151. Local proxy 13 is designed to send to browser 12 all messages that browser 12 normally would expect from a proxy. Local proxy 13 is therefore transparent to browser 12. However, when remote proxy 151 is compatible with the method of the invention, which almost inevitably would be the case if local proxy 13 exists because local proxy 13 preferably is created by software from the network service provider which presumably will only provide that software if its own remote proxy 151 is compatible, local proxy 13 and remote proxy 151 can communicate in ways designed to increase the apparent speed of connection 14. While the apparent speed increase might be accomplished in a number of ways, preferably it would be accomplished using the method described above, which is diagrammed in FIGS. 2–5, below.

Figure 2:
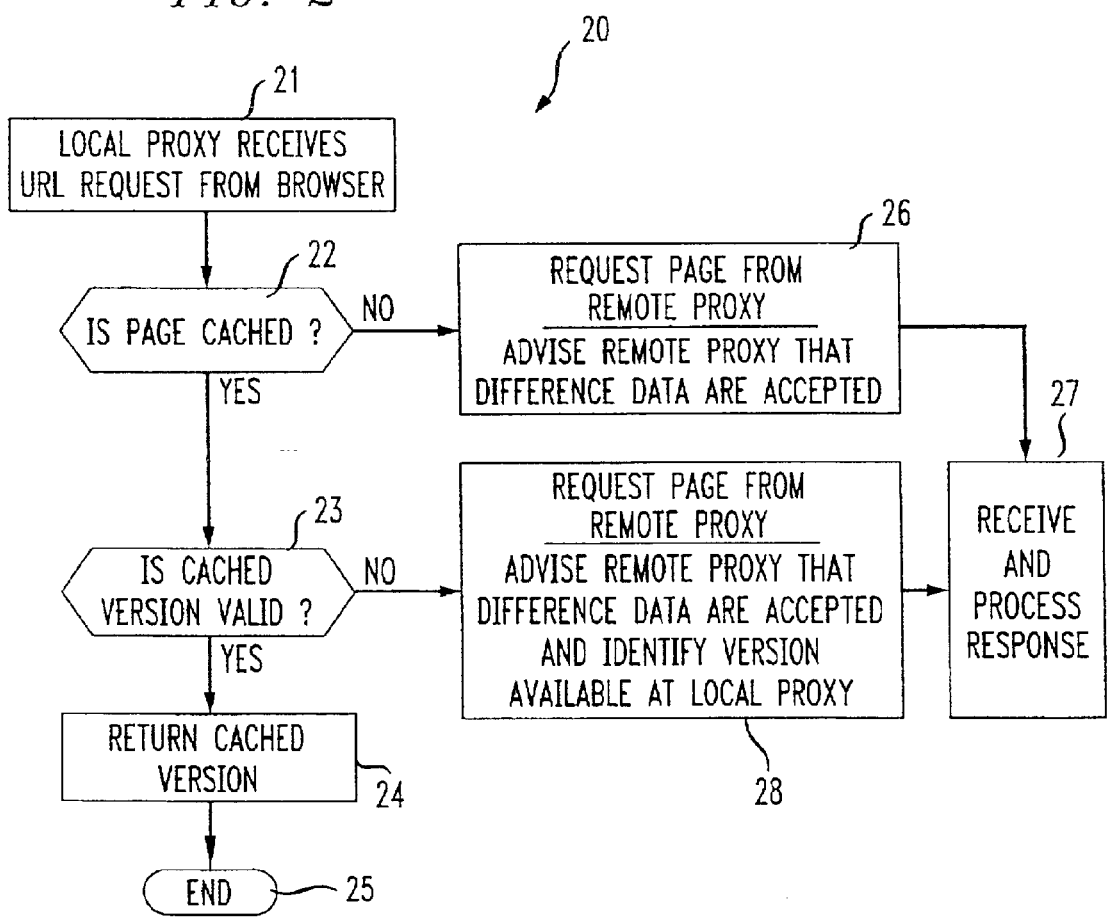
FIG. 2 is a flow diagram of a portion of the method of the present invention that is carried out by the local proxy shown in FIG. 1.
Figure 3:
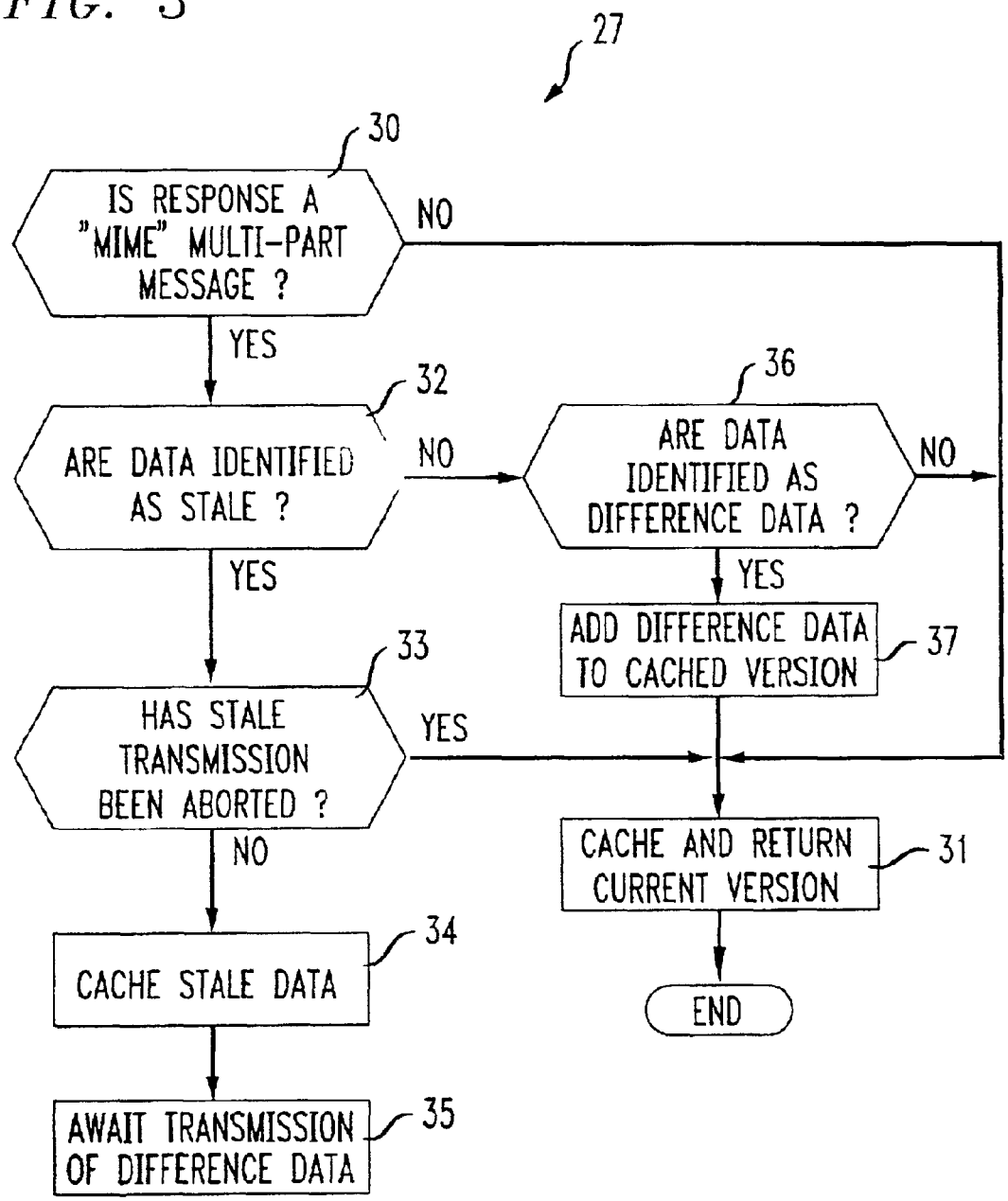
FIG. 3 is a flow diagram showing detail of one of the steps shown in FIG. 2.

The functioning of a preferred embodiment of process 20 carried out by local proxy 13 is shown in FIGS. 2 and 3.

At step 21, local proxy 13 receives a request from browser 12 to retrieve a page identified by a particular URL. At test 22, the system tests to see whether or not the requested page is cached locally. If so, then at test 23, the system tests to see whether or not the cached version is still valid. This test can be carried out by reference to an expiration date saved with the cached data. Alternatively, the browser may have sent instructions that a cached version is not to be used and that the requested page be re-loaded from its content provider. If at test 23 the cached version is determined to be valid, then local proxy 13 returns the cached version to browser 12 at step 24, and the method ends at 25.

If at test 23 it is determined that the cached version of the requested page is no longer valid, then at step 28 the requested page is requested from remote proxy 151. As part of the request, remote proxy 151 is advised by local proxy 13 that local proxy 13 is capable of dealing with difference data, and which version is cached at local proxy 13. The system then proceeds to step 27 where it waits to receive data in response to the request, and to process that data.

If at test 22 it is determined that the requested page has not been cached, then at step 26 the requested page is requested from remote proxy 151. As part of the request, remote proxy 151 is advised by local proxy 13 that local proxy 13 is capable of dealing with difference data, and system proceeds to step 27 where it waits to receive data in response to the request, and to process that data.

The processing of a response in step 27 is shown in expanded form in FIG. 3. HTTP responses are transmitted under a protocol known as MIME (an acronym for Multipart Internet Mail Extensions). Under the MIME protocol, messages can be single part messages or multipart messages. In this context, if the response is a single part message, then it is a new version of the requested page, while if it is a multipart message, either it may be the new version of the requested page, or it may be difference data or a stale version of the page. Information identifying the contents of the multipart message is found in the first part of the multipart message. Therefore, process 27 begins at test 30 where the system checks to see whether or not the response is a MIME multipart message. If not, then it must be a new page, and at step 31, the new page is cached by local proxy 13 and returned to browser 12 for display.

If at test 30 the response is determined to be a MIME multipart message, then at test 32 the system checks to see whether or not the first part of the message identifies the transmitted data as a stale version of the requested page. If so, the system continues to monitor at test 33 to see if the transmission of stale data is aborted (in case the remote proxy decides that the new page ought to be sent in its entirety instead). If so, then the remainder of the transmission is the new version of the requested page, which at step 31 is cached by local proxy 13 and returned to browser 12 for display. If at test 33 the transmission of stale data is not aborted, then at step 34 the stale data are cached and the system waits at step 35 for the difference data, which is processed in a similar manner.

If at test 32 the data are not identified as stale, then they may be difference data, and that possibility is tested at test 36. If the data are difference data, then at step 37 the difference data are added to the cached version of the requested page to produce the new version of the page, which at step 31 is cached by local proxy 13 and returned to browser 12 for display. If at test 36 the data are not identified as difference data, then they must be the new page in its entirety (despite the multipart nature of the response), which at step 31 is cached by local proxy 13 and returned to browser 12 for display.

Figure 4:
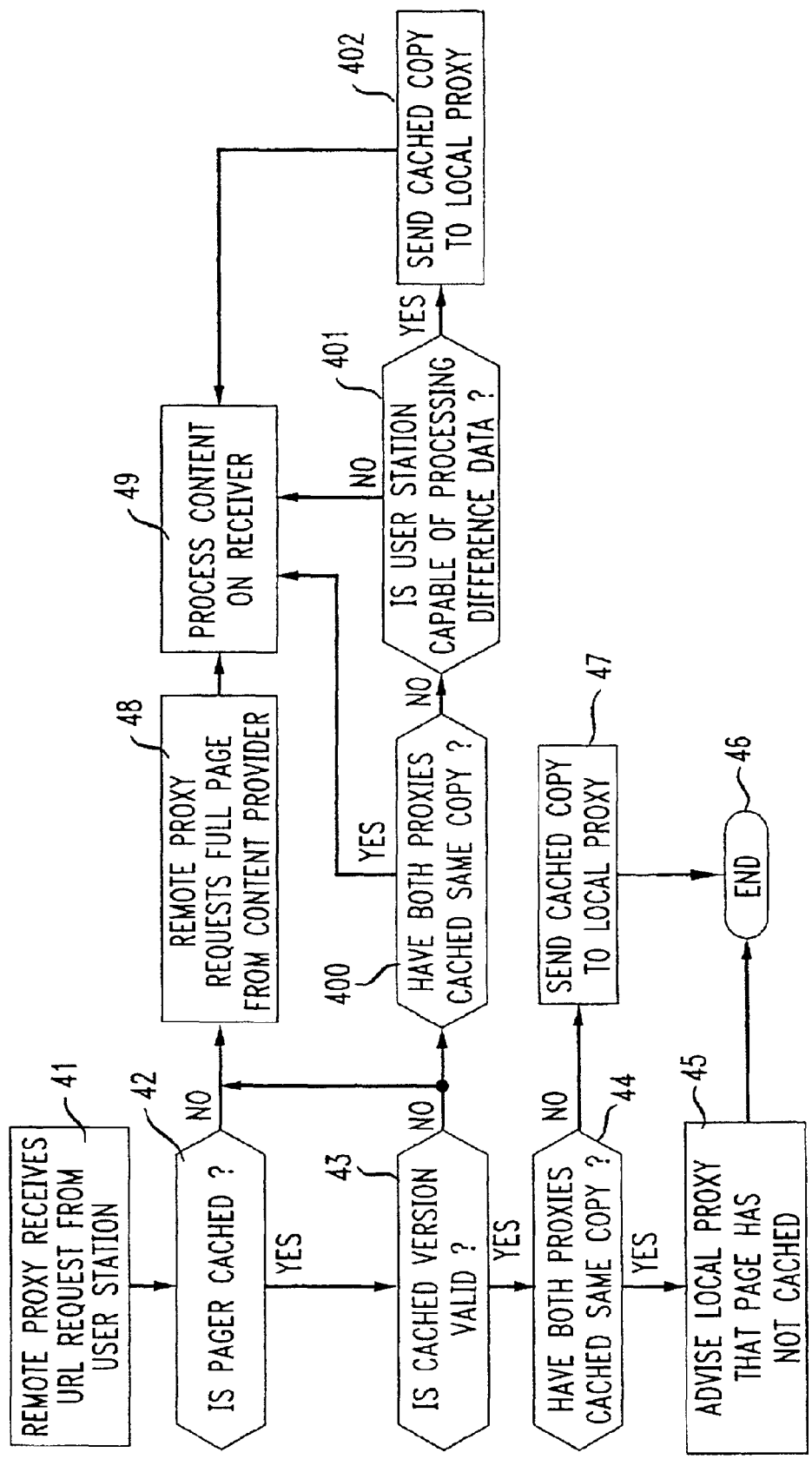
FIG. 4 is a flow diagram of a portion of the method of the present invention that is carried out by the remote proxy shown in FIG. 1.
Figure 5:
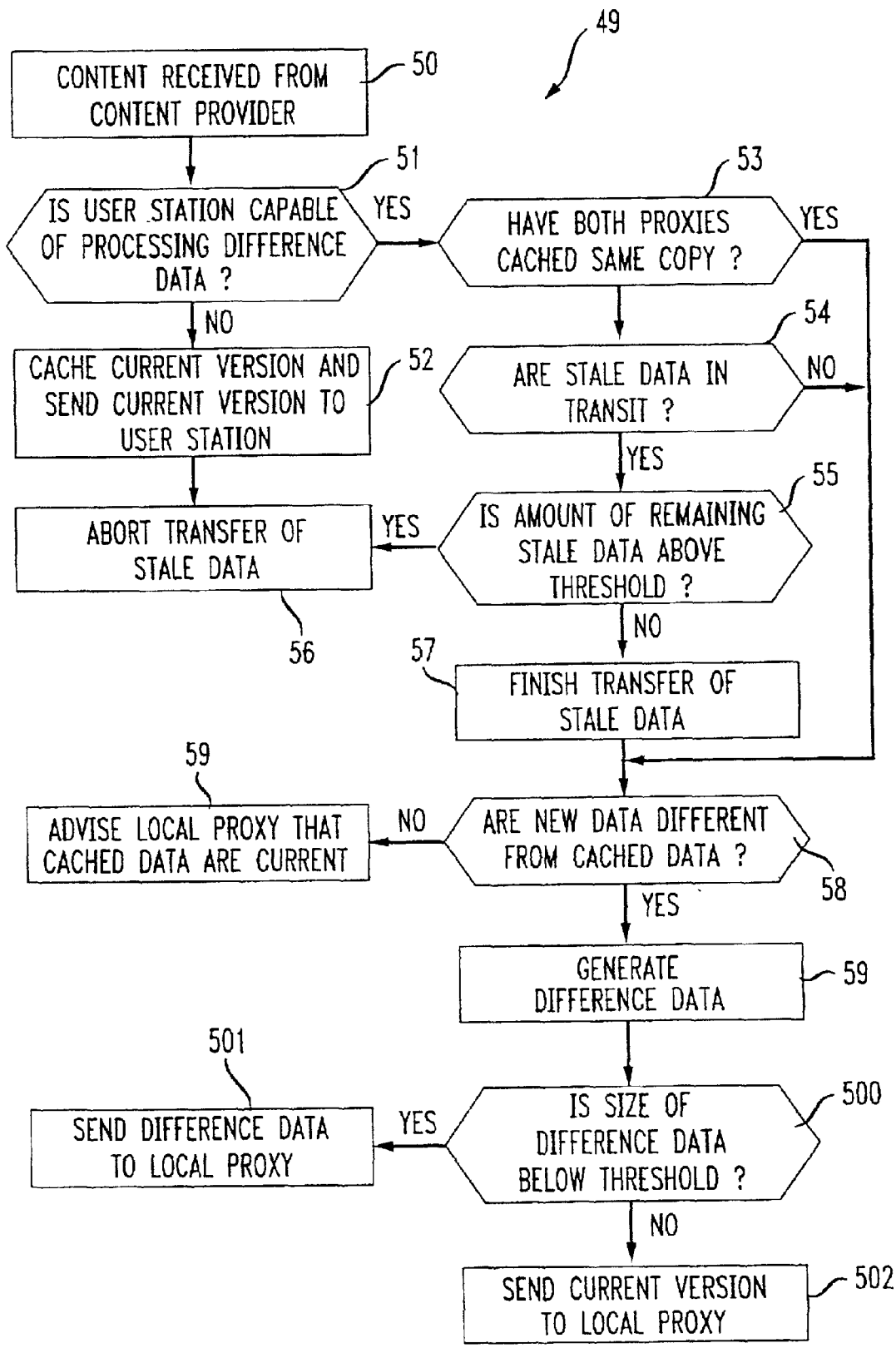
FIG. 5 is a flow diagram showing detail of one of the steps shown in FIG. 4.

The functioning of a preferred embodiment of process 40 carried out by remote proxy 151 is shown in FIGS. 4 and 5.

Process 40 starts at step 41 where remote proxy 151 receives a request from a user station 11 for a particular page identified by a specified URL. Note that it is possible that a particular user station 11 does not have the local proxy function enabled, so that process 40 preferably can account for that possibility and allow for requests from traditional browsers.

At test 42, the remote proxy tests to see whether or not it has the requested page in its cache. If so, then at test 43, the remote proxy tests to see whether or not the cached version is valid (e.g., by reference to its expiration date/time). If at test 43 the cached version is valid, then at test 44 the remote proxy tests to see whether or not both proxies (i.e., both the local and remote proxies 13, 151) have the same cached version. If so, then at step 45 the remote proxy advises the local proxy that the page has not changed, and process 40 ends at 46. If at test 44 it is determined that both proxies do not have the same version (this could include the situation where there is no local proxy at all), then at step 47 the remote proxy sends the new page to the local proxy and process 40 ends at 46.

If at test 42 the remote proxy determines that it has no cached version of the requested page, then at step 48 the remote proxy requests the page from the content provider via network 16, and at step 49 it waits for, and processes, that content.

If at test 43 the remote proxy determines that the cached version has expired or otherwise is not valid, then the remote proxy (1) proceeds to step 48 where it requests the page from the content provider via network 16, and then proceeds to step 49 where it waits for, and processes, that content, and; at the same time, (2) determines at test 400 whether or not both proxies (assuming there is a local proxy) have the same cached copy. If so, then the remote proxy merely continues to wait for, and process, the requested content at step 49. If at test 400 the remote proxy determines that both proxies do not have the same cached version this could include the situation where there is no local proxy at all, then at test 401 the remote proxy determines whether or not the user station is capable of processing difference data and stale data to construct the new page (as set forth in connection with steps 26 and 28 of process 20, the local proxy itself advises the remote proxy if it can process difference data, and the remote proxy makes its determination in test 401 based on whether or not it received such a message from the local proxy). If so, having already determined that the two proxies have cached different versions of the page, at step 402 the remote proxy sends to the local proxy the version that is has cached (so that both proxies have the same starting point for constructing the page using difference data), and then at step 49 waits for, and processes, the requested page. If at test 401 it is determined that the user station is not capable of processing difference data and stale data to construct the new page (e.g., it does not have a local proxy), then the remote proxy simply proceeds to step 49 to await the new page which it will have to send in its entirety to the user station in question.

As shown in expanded form in FIG. 5, process 49 begins at step 50 where the requested content has been received over network 16 from the content provider. At test 51 the remote proxy tests to determine whether or not user station 11 is capable of processing difference data. If not, then at step 52 the remote proxy caches the current version of the new page and also transmits it to the user station. If at test 51 the remote proxy determines that the user station can process difference data (i.e., it includes a local proxy in accordance with the invention), then at test 53, the remote proxy determines whether or not both proxies have the same cached version (based on data sent by the local proxy). If so, the remote proxy proceeds to test 58, discussed below. If at test 53 the remote proxy determines that the two proxies do not have the same cached data, then the remote proxy proceeds to test 54 where it determines whether or not stale data (i.e., an older version that had been cached at the remote proxy whose transmission to the local proxy was begun before the new version arrived in step 50) is still in transit to the local proxy. If not (i.e., the transfer of stale data has already been completed), then the remote proxy proceeds to test 58, discussed below. If at test 54 it is determined that stale data are still in transit, then at test 55 the remote proxy determines whether or not the amount of stale data remaining is above a threshold (e.g., 60% of the size of the stale version as discussed above). If so, then at step 56 the transfer of stale data is aborted and at the remote proxy proceeds to step 52 where the remote proxy caches the current version of the new page and also transmits it to the user station. If at test 55 the remote proxy determines that the amount of stale data remaining is below the threshold (i.e., most of the stale data has been sent), then at step 57 the remote proxy finishes the transfer of the stale data and continues to test 58.

At test 58, regardless of which route the remote proxy took to get there, the remote proxy determines whether or not the newly received data differ from the cached data. This could be determined by an actual file comparison or by comparing date/time stamps. Alternatively, the newly received data may simply be a message from the content provider that the version that was cached is still current. If by any of those methods it is determined that the new data are not different from the cached data, then at step 59 the remote proxy-advises the local proxy that the cached version is current (either the local proxy had already cached that version, or it has received it in the stale data transfer). (Note that when the method of determining that the new data are the same as the cached data is reliance on a "no change" message from the content provider, then in step 52, above, the sending of the current version involves sending the cached version, and no additional caching by the remote proxy is actually needed in step 52.)

If at test 58 the new data are determined to differ from the cached data, then at step 59 the actual differences are determined by a direct comparison. The remote proxy then proceeds to test 500 to determine whether or not the size of the difference data is below a threshold. As discussed above, one comparison is whether the difference data are smaller than the new page itself, while other factors also are considered as discussed above. If at test 500 the size of the difference data is below the threshold, then the remote proxy proceeds to step 501 and sends the difference data to the local proxy, which uses it to reconstruct the new page (step 37). If at test 500 the size of the difference data is not below the threshold, then the remote proxy decides that sending the difference data would not be productive, and proceeds to step 502 where it simply sends the new page to the local proxy.

Figure 6:
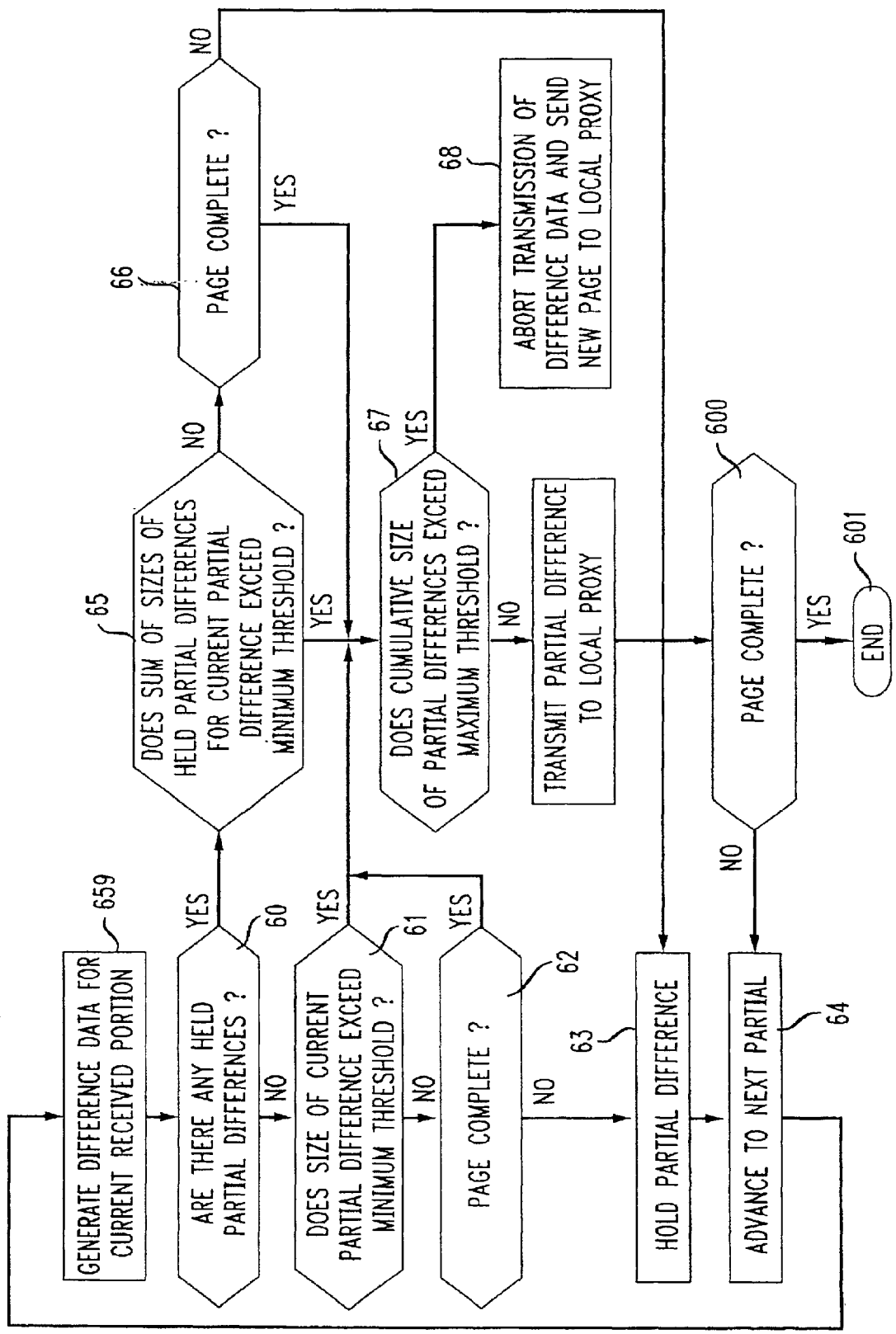
FIG. 6 is a flow diagram showing detail of an alternative embodiment one of the steps shown in FIG. 4.

FIG. 6 shows a portion of a modified version of process 49 wherein difference data is calculated and transmitted "on the fly" as described above. The partial process shown in FIG. 6 replaces steps/tests 59, 500, 501 and 502 of FIG. 5.

At step 659, difference data are determined for a current received portion of the new page data. Next, at test 60, it is determined whether or not there are any partial differences being held (the first time through, the answer will always be no). If not, then at test 61 it is determined whether or not the size of the current partial difference exceeds a minimum threshold for transmission as discussed above. If not, then at test 62 it is determined whether or not the page is complete. If not, then at step 63, the partial difference is held, and accumulated with any previously held partial differences, and at step 64 the next portion is advanced to and the process returns to step 659.

If at test 61 the size of the current partial difference had exceeded the minimum threshold for transmission, or at test 62 the page had been complete (meaning the current partial difference must be transmitted even if it is otherwise too small), the process would advance to test 67, discussed below.

If at test 60 there had been held partial differences, the method would proceed to test 65 to determine whether or not the sizes of the held and current partial differences exceed the minimum threshold for transmission. If not, then at test 66 it is determined whether or not the page is complete. If not, then at step 63, the partial difference is held, and accumulated with any previously held partial differences, and at step 64 the next portion is advanced to and the process returns to step 659.

If at test 65 the sizes of the held and current-partial differences exceed the minimum threshold for transmission, or at test 66 the page is complete (meaning the current partial difference must be transmitted even if it is otherwise too small), the process would advance to test 67.

At test 67, it is determined whether or not the cumulative size of partial differences already transferred and those about to be transferred exceed the maximum threshold discussed above. If so, then at step 68 the partial difference process is aborted and the new page data are sent to the local proxy. This transmission itself can occur after the remote proxy has received the complete new page, or in portions as the portions are received at the remote proxy. It is recognized that aborting the partial difference process on reaching the maximum threshold may be counterproductive, because the additional amount of difference data yet to be computed might be small, but there is no way to know that. Other techniques may be developed to address this.

If at test 67, the cumulative size of partial differences already transferred and those about to be transferred do not exceed the maximum threshold, then the current partial difference and any held partial differences are transmitted to the local proxy at step 69. At test 600, it is determined whether or not the page is complete, in which case the process ends at 601. Otherwise, the process advances to step 64 where the next portion is processed.

It should be noted that in accordance with the present invention, cached pages are retained even after their ostensible expiration dates, and "uncacheable" pages are cached. This is because even an expired version might still be better than no version in a system that relies on sending earlier data in advance and following it up with differences. As long as the differences between the earlier version (expired or not) and the current version can be calculated, expiration dates and "cacheability" do not matter. This is acceptable because cached pages are used only to produce difference data based on retrieval of the current page.

Thus it is seen that this invention reduces the perceived delays encountered in transmitting data pages from a relatively fast network to a user connected to the network by a relatively slow connection, in part by making better use of the caching capabilities of browsers. One skilled in the art will appreciate that the present invention can be practiced by other than the described embodiments, which are presented for purposes of illustration and not of limitation, and the present invention is limited only by the claims which follow.

What is claimed is:

1. A method for reducing the delay between the time a data page is requested and the time the data page is displayed comprising the steps of:
   receiving a request for retrieval of a data page wherein the request further comprises an indication that a response to the request can contain difference data;
   transmitting a first version of the data page in response to the request;
   determining whether there is a difference between a second version of the data page and the first version of the data page; and
   if there is a difference between the second version of the data page and the first version of the data page, transmitting in response to said request difference data computed from the difference between the first version of the data page and the second version of the data page.

2. The method of claim 1 wherein the first version of the data page is retrieved from a cache.

3. The method of claim 2 wherein the step of determining the difference between the second version of the data page and the first version of the data page further comprises the step of contacting a server storing the second version of the data page.

4. The method of claim 3 wherein the difference data is retrieved from the server storing the second version of the data page if the server determines that the second version of the data page is different from the first version of the data page in the cache.

5. The method of claim 3 wherein the second version of the data page is retrieved from the server storing the second version of the data page and used to compute the difference data.

6. The method of claim 5 wherein difference data is computed on a continuing basis as the second version of the data page is retrieved from the server.

7. The method of claim 6 wherein computation and transmission of the difference data is aborted and the second version of the data page is transmitted in response to the request if the difference data has a size that exceeds a threshold.

8. The method of claim 7 wherein the threshold is a function of the size of the data page.

9. The method of claim 1 wherein transmission of a response containing the difference data is aborted and the second version of the data page is transmitted in response to the request if the second version of the data page has a size that exceeds a threshold based on the size of the difference data.

10. The method of claim 9 wherein the threshold is also based on a cost of computing the second version of the data page from the difference data.

11. The method of claim 1 wherein transmission of the first version of the data page and of a response containing the difference data are aborted and the second version of the data page transmitted in response to the request if only a portion of the first version of the data page has been transmitted and the portion has a size that does not exceed a threshold.

12. The method of claim 11 wherein the threshold is based on the size of the data page.

13. The method of claim 1 wherein the second version of the data page is a current version of the data page.

14. The method of claim 1 wherein a response to the request is transmitted indicating that, the first version of the data page has not been modified if there is no difference between the second version of the data page and the first version of the data page.

15. A method for reducing the delay between the time a data page is requested and the time the data page is displayed comprising the steps of:
   receiving a request for retrieval of a data page wherein the request further comprises identification of a first version of the data page and an indication that a response to the request can contain difference data;
   determining a difference between a second version of the data page and the first version of the data page;
   if there is no difference between the second version of the data page and the first version of the data page, transmitting a response to the request indicating that the first version of the data page has not been modified; and
   if there is a difference between the second version of the data page and the first version of the data page, transmitting a response containing difference data computed from the difference between the first version of the data page and the second version of the data page.

16. The method of claim 15 wherein the first version of the data page is retrieved from a cache.

17. The method of claim 16 where the second version of the data page is a current version of the data page.

18. The method of claim 15 wherein the transmission of a response containing the difference data is aborted and the second version of the data page is transmitted in response to the request if the second version of the data page has a size that exceeds a threshold based on the size of the difference data.

19. The method of claim 18 wherein the threshold is also based on a cost of computing the second version of the data page from the difference data.

* * * * *